April 21, 1936.  J. W. RACKLYEFT  2,038,084

IRONING MACHINE CLUTCH

Filed July 16, 1929  2 Sheets-Sheet 1

John W. Racklyeft
Inventor
by Smith and Freeman
Attorneys

April 21, 1936. J. W. RACKLYEFT 2,038,084
IRONING MACHINE CLUTCH
Filed July 16, 1929 2 Sheets-Sheet 2
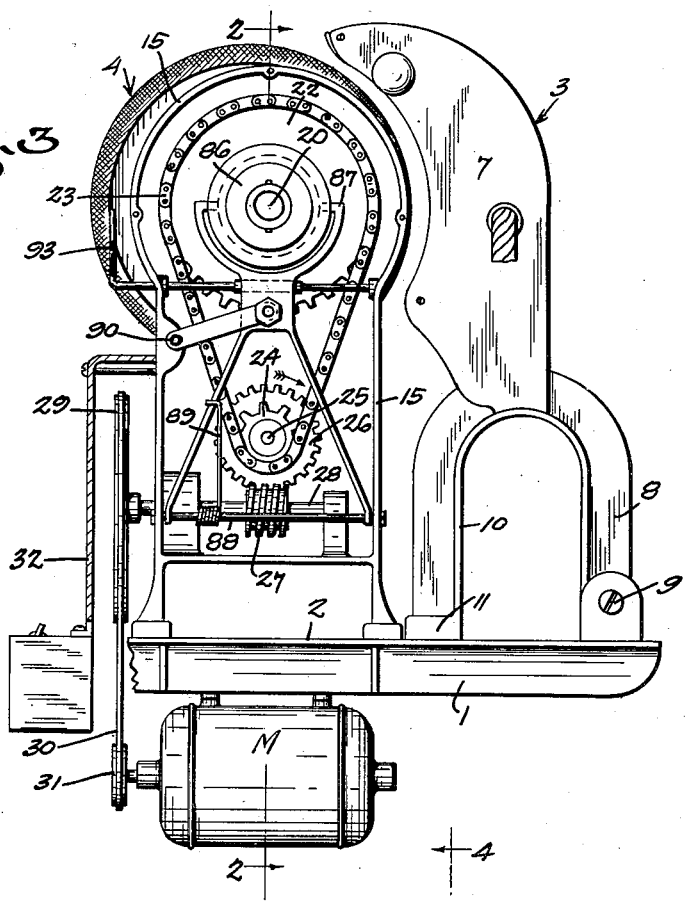
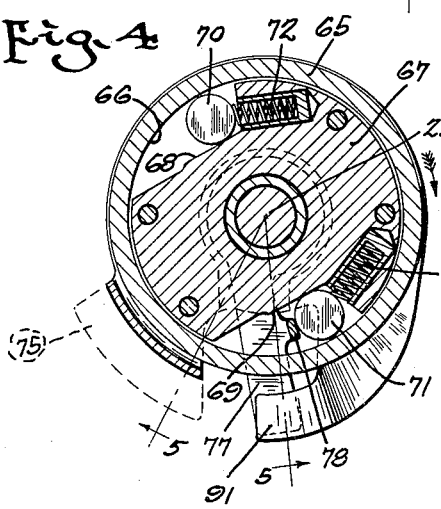
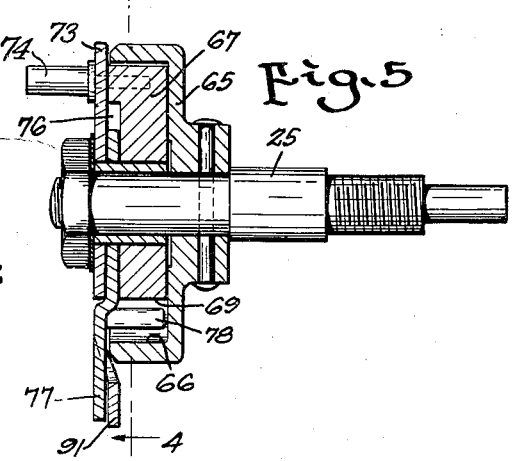
John W. Racklyeft
Inventor
by Smith and Freeman
Attorneys Patented Apr. 21, 1936

2,038,084

UNITED STATES PATENT OFFICE 2,038,084

IRONING MACHINE CLUTCH

John W. Racklyeft, Cleveland, Ohio, assignor to The Apex Electrical Manufacturing Company, Cleveland, Ohio, a corporation of Ohio Application July 16, 1929, Serial No. 378,592

9 Claims. (Cl. 192—27)

This invention relates to ironing machines and has for its object the provision of an improved clutch whereby the driving motor can be connected in operating relation to move the roll or shoe, one toward and from the other, and to arrest the motion thereof at a selected point so as to hold the same against movement in either direction until a different setting shall be desired by the operator, and whereby such new setting shall be accomplished quietly, smoothly, accurately, and reliably; the provision of a clutch for the purpose described which shall be simple, easily made, and of manufacture by quantity production methods without requiring close tolerances; the provision of a new and improved combination of friction clutch and irreversible gear for the purpose in view; while further objects and advantages of the invention will become apparent as the description proceeds.

This application is in some respects a continuation of my former application filed February 10, 1927, Serial No. 167,314 and which on July 26, 1932 matured into U. S. Patent No. 1,868,806.

Figure 1:
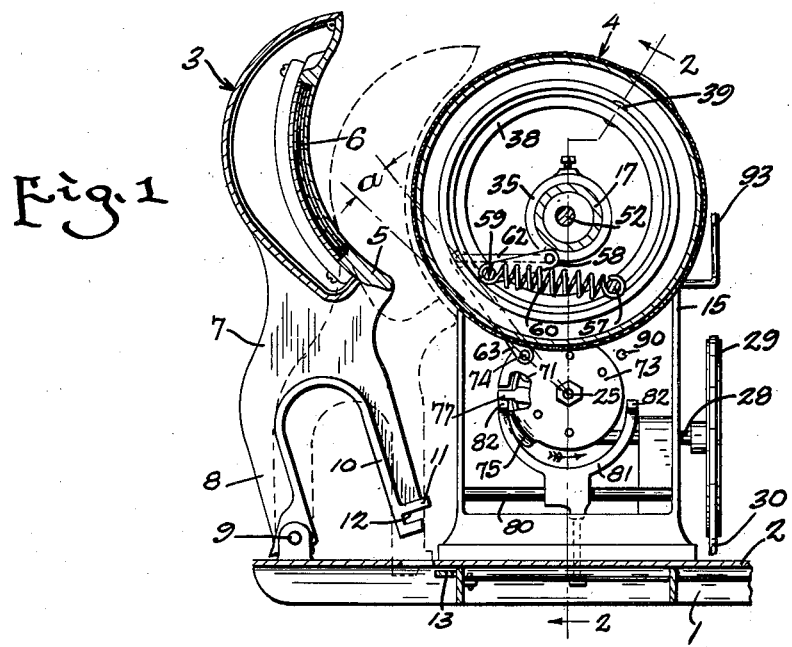
Figure 2:
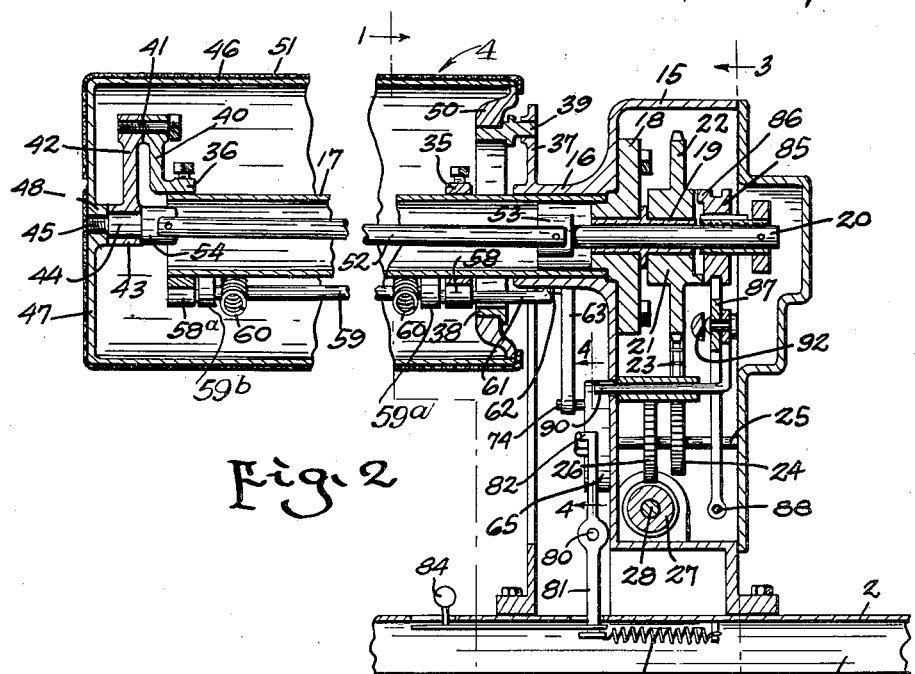
Figure 6:
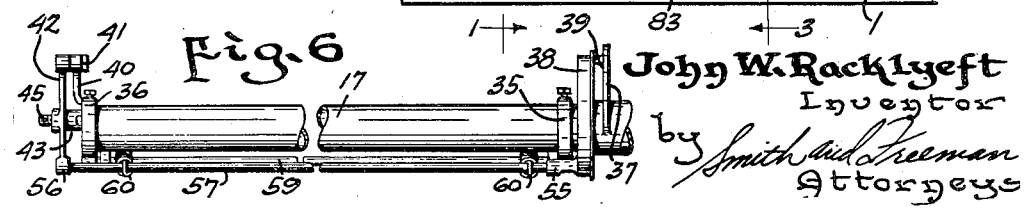

In the drawings I have shown a preferred embodiment of my invention in operative relation with a domestic ironing machine of the type wherein the shoe is stationary and the roll is moved toward and from the same; although it will be understood that I submit these drawings for illustrative purposes only and not as limiting me to the constructions therein shown. Fig. 1 is a vertical, cross-sectional, view taken on the line 1—1 of Fig. 2; Fig. 2 is a vertical sectional view on the line 2—2 of Figs. 1 and 3; Fig. 3 is a sectional view corresponding substantially to the line 3—3 of Fig. 2; Fig. 4 is an enlarged sectional view of the clutch corresponding substantially to the line 4—4 of Figs. 2 and 5; Fig. 5 is a sectional view of the clutch taken on the broken line 5—5 of Fig. 4; and Fig. 6 is a detail view of part of the roll mechanism shown in Fig. 2, the roll itself being omitted.

Such an ironing machine comprises a frame 1 of some kind, generally associated with a top-plate 2, and carrying a shoe, here indicated generally at 3, and a roll here indicated generally at 4, together with a driving motor M. The shoe and roll may be of any suitable or desired construction. In the present embodiment the shoe includes a concave-faced, metal plate 5 mounted between end frames 7 and provided with suitable heating means here exemplified by an electric resistance element 6. In the present embodiment the shoe is held stationary during operation and the roll moved towards and from the same (although the clutch hereinafter described is not limited to this mode of operation), each end frame 7 being provided with two legs, one as shown at 8 being pivoted to the frame 1 at the point 9, and the other leg, 10, being provided both with a foot 11 to rest on the frame and with a notch 12 adapted for the reception of a latching member 13 capable of being withdrawn upon emergency to let the shoe fall away from the roll as shown in Fig. 1.

Carried by the frame 1 in front of and at one end of said shoe is a hollow metal housing 15 which constitutes an enclosure for the operating mechanism and a support for the roll 4 and a work rest (not shown). Projecting from one face of this housing, with its axis spaced from and parallel to that of the concave face of the plate 5, is a hub 16 in which is rigidly mounted, as by being shrunk therein, a horizontal, cylindrical tube 17. Rigidly secured inside the housing is a bearing block 18 which carries the tubular bearing sleeve 19 in which is located the stub shaft 20. Rotatably journaled on the exterior of the tube 19 is the hub 21 of a sprocket wheel 22 connected by a driving chain 23 with the sprocket wheel 24 carried on a lay shaft 25 which also possesses a worm gear 26 meshing with a worm 27. This worm is carried by a cross-shaft 28 having thereon a pulley 29 driven by a belt 30 from a pulley 31 on the shaft of the motor M. This belt and pulley are covered by a removable, sheet-metal, housing 32, separate from and in front of the housing 15. Rigidly clamped upon the tube 17 are the fittings 35 and 36 adjacent to opposite ends of the same, while carried by the hub 16 is a rigid bracket 37.

Loosely surrounding the tube 17 is a cylindrical bearing ring 38 pivoted to the bracket 37 on a horizontal axis 39 above and parallel to the shaft 20. Rigid with the fitting 36 is an arm 40 having at its free end a pivot 41 coaxial with the pivot 39 and carried thereby is a swinging arm 42 having intermediate its ends a bearing member 43 in which is journaled the stub shaft 44 whose outer end is threaded at 45 for the reception of the roll. This roll comprises a cylindrical sheet metal casing 46 having at one end a head 47 formed with a threaded socket 48 for the reception of the stub shaft 44 and having at the opposite end a circular rim 50 adapted to run on the surface of the ring 38. The exterior of the roll is covered with padding material 51 of the usual or any suitable substance. The stub shaft 20 is operatively connected to the stub shaft 44 by means of the drive shaft 52 provided at opposite ends with universal joints 53 and 54 respectively. The diameter of the tube 17 is so chosen intermediate the external diameter of the shaft 52 and the internal diameter of the ring 38 as to permit the bodily movement of the roll about the axes 39—41, the shaft 52 moving from one position to another inside the tube corresponding to the movement of the roll outside said tube. In Fig. 3 the roll is shown at its position of maximum displacement from the shoe.

To accomplish this movement of the roll, I have shown the following mechanism: Rigid with the ring 38 is a bracket 55 and rigid with the member 42 is a downwardly extending bracket 56 and to said brackets are secured two ends of the rod 57. Projecting from the fitting 35 is an ear 58 in which is journaled a rock-shaft 61 to the opposite ends of which are secured levers or crank arms 59ª and 62 respectively. The end of the lever 62 is articulated to the link 63 by means of which the lever 62 is rocked back and forth. Carried by the fitting 36 is a projection 58ª to which is pivoted a lever or crank arm 59ᵇ similar to that at 59ª and the free ends of the lever arms 59ª and 59ᵇ are connected by a rod 59 which is resiliently connected at opposite ends to the rod 57 by the tension springs 60, 60. It will be seen that rocking the shaft 61 in one direction or the other will cause a movement of the rod 59 toward and away from the shoe, which movement will be conveyed to the rod 57 and the roll 4 by way of the springs 60, 60. The foregoing construction constitutes the subject matter of my application Serial No. 167,314, and such construction is here included only as illustrative of an installation with which my improved clutch may be employed.

To effect this rocking movement by the action of the power of the motor M, I have shown the following mechanism: The lay shaft 25 projects through the forward wall of the housing 15 and is there provided with a clutch of the construction shown in Figs. 1, 2, 4, and 5. Rigidly secured to the shaft 25 so that it may rotate therewith is a cup-shaped member 65 having an internal, cylindrical, bearing-face 66, and rotatably mounted upon said shaft inside said cup and concentric with the surface 66 is a metal disk 67, formed at opposite sides with notches having their walls slanted in opposite peripheral directions as shown at 68 and 69. Located in these notches are the roller elements 70 and 71, respectively, and carried by the disk adjacent these rollers are springs 72—72 whereby these rollers are forced into engaging relation between the walls of their respective notches and the cylindrical surface 66. Rigidly secured to the outer face of the disk 67 so as to rotate therewith is a circular plate 73, provided at one point with a projecting pin 74 articulated to the link 63 and formed at another point with an overhanging cam surface 75. It will be seen that, so long as both the rolls 70 and 71 exhibit a wedging relation with their notches, any rotation of shaft 25 must necessarily carry the plate 73 with it.

Formed in the face of the disk 67 inside the plate 73 is a recess 76 in which the lever arm 77 is pivoted, concentric with the shaft 25, and this lever arm is provided with a finger 78 projecting into one of the notches of the disk upon the opposite side of the roller 71 from its spring 72. The end of the lever 77 projects outside of the periphery of the cup as shown in Figs. 1 and 5.

Pivoted to the housing 15 upon a horizontal rod 80 is a yoke 81 having at opposite ends the heads 82 located one at each side of the clutch in a position to be engaged by the lever 77 as the clutch revolves. This yoke is ordinarily held in arresting position by means of a suitable spring 83 as shown for example in Fig. 2, while upon occasion it is displaced against the action of the spring by any suitable means such as the knob 84.

Slidably splined upon the projecting end of the shaft 20 adjacent the hub 21 is a clutch-spool 85 having its face formed with clutch teeth 86 adapted to engage with similar teeth formed in the hub. This clutch spool is moved along the shaft by means of a yoke 87 pivoted on the bar 88 and normally moved towards engaging position by means of a suitable spring 89. Slidably supported in the housing 15 is a pin 90, having one end projecting close to the clutch in a position to be engaged by the cam 75, and having the opposite end connected to the yoke 87 as shown in Figs. 2 and 3.

During the operation of the motor, the shaft 25 and sprocket 24 rotate continuously in the direction indicated by the arrows in Figs. 1, 3 and 4, but rotation of the driven-element 67 of the clutch cannot occur until the lever 77 is released from contact with one of the fingers 82 whereupon the roller 71 is free to move into engagement with the driving element 65 of the clutch. In Fig. 1 I have shown the clutch parts in the position they occupy at the instant of disengagement after the roll has been moved into ironing position, the link 63 being elevated to its upper position and the pin 74 moved past its dead center position an amount equal to the angle a between the dot and dash lines, Fig. 1, whereby the tension imparted to the springs 60 acting through the link 63, serves to insure the further movement of the plate 73 to a position where its projection 91 engages the finger 82 thus to further compress the spring 72 associated with the roller 71 to effect complete disengagement of the clutch parts 71 and 65 and to maintain them in such position thereby effectively preventing frictional drag between the clutch parts and overheating of the same. The shifting of the roll is accompanied by a stretching of the springs 60, the movement of the roll having been arrested by contact with the shoe which is normally in the dotted line position shown in Fig. 1. The projection 91 of the plate 73 is adapted to engage the finger 82 just after the roller 71 is unseated and the clutch released, this being for the following reasons in addition to the one already mentioned: namely, to arrest the motion with certainty and to hold the plate 73 stationary despite the action of the springs 60.

Until now the roller 70 has been functionless, but as soon as the yoke 81 is tripped a second time the pressure of these springs would cause the plate 73 to return to its initial position with undue suddenness were it not for this roller 70 which comes into action the instant the plate 73 attempts to outstrip the rotation of the shaft 25. This clutch can be arrested at any point depending upon the position of the fingers 82, and as soon as released by the withdrawal of one of the fingers from obstructing position will rotate until it comes in contact with a succeeding finger. In the present embodiment these fingers are shown as located on opposite sides of the shaft 25 a slight distance below the axis thereof and corresponding to the two extreme positions of the crank shaft 61.

The aforesaid arrangement permits the operation in its disengaged positions of a roller type friction clutch with little, if any, frictional drag. It is a characteristic of clutches of this type that when the movement of the driving roller or rollers is arrested to disengage the clutch when the clutch is operating under load, the roller or rollers will release just enough to prevent further movement of the driven part of the clutch and this partial disengagement of the clutch causes a frictional drag to take place which is somewhat less than the force necessary to overcome the resistance offered by the driven element of the clutch. In a machine of the type described, this frictional drag is sufficient to cause excessive heating and wear on the clutch parts, and in a relatively short time the clutch is thus rendered unfit for use, so that the provision of means for insuring the complete release of the clutch at the time when it is under load and doing work is of considerable importance in a device of the class described.

When the clutch is not under load, as for example, when it is moving the roll away from the shoe, the driving roller 71 does not engage the driving and driven parts of the clutch with any great force and consequently it does not require much force to effect the complete disengagement of the roller 71 with respect to such parts when the roll is moved away from the shoe, and it has been observed in the operation of the ironer shown, that dragging and overheating of the clutch never takes place for the position of the clutch corresponding to the position of the ironer elements in which the roll is separated from the shoe, so that special provisions need not be made to insure the complete disengagement of the clutch for this position as such disengagement will naturally take place with the type of clutch shown under the conditions specified.

In one position of the driven plate 73 of the friction or roller clutch, the spool 85 of the ironer roll driving clutch is held in disengaged position by the contact of the cam 75 and rod 90. At other positions the clutch spool 85 engages with the hub 21 excepting when the cam 92 is moved to a neutral position by the lever 93. This procures that the roll should rotate only while in contact with the shoe, and not even then in case the cam 92 be set against it, thus enabling the machine to be used for pressing clothing.
Having thus described my invention what I claim is:

1. In a clutch, in combination, a cup-shaped driving element, a driven element therein, one having a surface of revolution and the other having two oppositely slanted camming surfaces opposed thereto, a plate carried by said driven element and rotatable therewith, a roller element between each of said camming surfaces and said surface of revolution, means rotatable with said element which has the camming surfaces for forcing said roller elements into clutch engaging relation, and a lever rotatable with the driven element and projecting radially between said plate and cup and adapted when arrested to disengage from the driving element that roller-element which produces the forward-driving effect.

2. In a clutch, in combination, a cup-shaped driving element and a driven element therein, the former having a part defining a surface of revolution, and the latter having two parts which are slanted relatively thereto in circumferentially opposite directions, a plate carried by said driven element and rotatable therewith, two wedging elements located between said first elements, a spring tending to force each of said wedging elements into driving engagement with the tapering walls between which it is located, a lever pivoted to and rotatable with the driven element and projecting radially between said plate and cup-shaped element, said lever having a part engaging one of said wedging elements on the side opposite the corresponding spring, and means outside said driving and driven elements adapted to engage said lever and arrest its rotation and thereby disengage the corresponding wedging element from its engagement with said driving element.

3. In a clutch, a cup-shaped driving element, a driven element therein, a plate carried by said driven element and overlapping the rim of said driving element, means associated with said plate, and movable thereby successively to one of two limiting positions, a clutch-controlling lever rotatable with said driven element and projecting radially between said plate and cup-shaped driving element, and a pair of stops for said lever to control the movement of said means and plate.

4. In a clutch, a cup-shaped driving element, a driven element therein, a plate carried by said driven element and overlapping the rim of said driving element, means associated with said plate and movable thereby to one of two limiting positions, a controlling lever for said clutch carried by and rotatable with said plate, a stop member for engaging and arresting said lever and thereby stopping the movement of said means in one of its limiting positions, the margins of said plate being bent into the shape of a cam, and a member operated by the cam of said plate.

5. In a friction-type roller clutch a cup-shaped driving element, a driven element therein, a friction roller for connecting said elements in driving relation, a plate carried by said driven element and overlapping the rim of said driving element, means associated with said plate and movable thereby to one of two limiting positions, a controlling lever for said roller carried by and rotatable with said plate, a stop member for engaging and arresting said lever, and a finger carried by said plate adjacent to said lever and moved into engagement with said stop by said means just after engagement is made between said stop member and lever, said finger and lever cooperating with said stop member in controlling the movement of said means to its limiting positions.

6. In a friction clutch, driving and driven elements and a member for selectively effecting frictional driving connection between such elements, one of said elements having a friction face in the form of a surface of revolution adapted for engagement with said member, control means for actuating said member in effecting the engagement and disengagement of the clutch, and a device to be driven connected to the driven element of the clutch and reacting therewith upon partial disengagement of the clutch to move and hold the driven element thereof out of contact with said member whereby to complete the disengagement of the clutch and to maintain it in its disengaged position.

7. In a friction clutch, driving and driven elements and a member for selectively effecting frictional driving connection between such elements, one of said elements having a friction face in the form of a surface of revolution adapted for engagement with said member, control means for actuating said member in effecting the engagement and disengagement of the clutch, and a device to be driven connected to the driven element of the clutch, opposing movement thereof prior to disengagement of the clutch and reacting therewith upon partial disengagement of the clutch to move and hold the driven element thereof out of contact with said member whereby to complete the disengagement of the clutch and to maintain it in its disengaged position.

8. In a friction clutch, driving and driven elements and a member for selectively effecting frictional driving connection between such elements, one of said elements having a friction face in the form of a surface of revolution adapted for engagement with said member, control means for actuating said member in effecting the engagement and disengagement of the clutch, said control means having a part cooperating with said driven element to provide a positive stop therefor, and a device to be driven connected to the driven element of the clutch and reacting therewith upon partial disengagement of the clutch to move and hold the driven element thereof against said stop whereby to complete the disengagement of the clutch and to maintain it in its disengaged position.

9. In a friction clutch, driving and driven elements and a member for selectively effecting frictional driving connection between such elements, one of said elements having a friction face in the form of a surface of revolution adapted for engagement with said member, control means including a spring for actuating said member in effecting the engagement and disengagement of the clutch, said control means having a part cooperating with said driven element to provide a positive stop therefor, and a device to be driven connected to the driven element of the clutch and reacting therewith upon partial disengagement of the clutch to move and hold the driven element thereof against said stop while at the same time moving said member in opposition to the force exerted by said spring whereby to complete the disengagement of the clutch and to maintain it in its disengaged position.

JOHN W. RACKLYEFT.

CERTIFICATE OF CORRECTION.

Patent No. 2,038,084.  April 21, 1936.

JOHN W. RACKLYEFT.

It is hereby certified that error appears in the printed specification of the above numbered patent requiring correction as follows: Page 3, first column, after line 49, insert the following paragraph:

It will be understood that many changes in detail can be made within the purview of my invention and that I do not limit myself as specifically set forth in my several claims.;

page 3, second column, line 16, claim 3, strike out the comma after the word "plate"; and that the said Letters Patent should be read with these corrections therein that the same may conform to the record of the case in the Patent Office.

Signed and sealed this 2nd day of June, A. D. 1936.

Leslie Frazer (Seal) Acting Commissioner of Patents.